（12）United States Patent
Brundage et al.

(10) Patent No.: US 8,898,137 B1
(45) Date of Patent: Nov. 25, 2014

(54) URL RESCUE BY EXECUTION OF SEARCH USING INFORMATION EXTRACTED FROM INVALID URL

(75) Inventors: Michael L. Brundage, Kirkland, WA (US); Sarah E. Williams, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 154 days.

(21) Appl. No.: 12/822,531

(22) Filed: Jun. 24, 2010

(51) Int. Cl.
*G06F 17/30* (2006.01)

(52) U.S. Cl.
USPC .......................................................... 707/708

(58) Field of Classification Search
USPC ........................... 707/769, 758, E17.107, 708
See application file for complete search history.

(56) References Cited

U.S. PATENT DOCUMENTS

| | | | |
|---|---|---|---|
| 5,892,919 A | 4/1999 | Nielsen | |
| 5,941,944 A | 8/1999 | Messerly | |
| 6,009,459 A * | 12/1999 | Belfiore et al. | 709/203 |
| 6,041,324 A | 3/2000 | Earl et al. | |
| 6,061,738 A | 5/2000 | Osaku et al. | |
| 6,092,100 A * | 7/2000 | Berstis et al. | 709/203 |
| 6,094,665 A * | 7/2000 | Lyons et al. | 715/234 |
| 6,154,738 A | 11/2000 | Call | |
| 6,202,087 B1 | 3/2001 | Gadish | |
| 6,282,548 B1 | 8/2001 | Burner et al. | |
| 6,332,158 B1 | 12/2001 | Risley et al. | |
| 6,487,555 B1 | 11/2002 | Bharat et al. | |
| 6,549,941 B1 | 4/2003 | Jaquith et al. | |
| 6,594,697 B1 | 7/2003 | Praitis et al. | |
| 6,654,741 B1 * | 11/2003 | Cohen et al. | 1/1 |
| 6,687,734 B1 | 2/2004 | Sellink et al. | |
| 6,782,430 B1 | 8/2004 | Cragun | |
| 6,895,430 B1 | 5/2005 | Schneider | |
| 6,934,753 B2 | 8/2005 | Kim | |
| 6,987,987 B1 | 1/2006 | Vacanti et al. | |
| 7,010,568 B1 * | 3/2006 | Schneider et al. | 709/203 |
| 7,058,633 B1 | 6/2006 | Gnagy et al. | |
| 7,130,923 B2 * | 10/2006 | Mason | 709/245 |
| 7,162,698 B2 | 1/2007 | Huntington et al. | |
| 7,240,100 B1 | 7/2007 | Wein et al. | |
| 7,325,045 B1 | 1/2008 | Manber et al. | |
| 7,536,391 B2 | 5/2009 | Christian et al. | |

(Continued)

OTHER PUBLICATIONS

U.S. Appl. No. 12/822,472, filed Jun. 24, 2010, Brundage, et al.

(Continued)

*Primary Examiner* — Shiow-Jy Fan
(74) *Attorney, Agent, or Firm* — Knobbe, Martens, Olson & Bear, LLP

(57) ABSTRACT

A server system is disclosed that is capable of providing responsive content to a user when a request for an invalid URL is received. In a preferred embodiment, the server system implements multiple rescue strategies for attempting to rescue the invalid URL. One such rescue strategy involves repairing the URL by correcting for encoding errors, such as errors introduced by some web clients. Another rescue strategy involves determining that the URL contains an obsolete or outdated item identifier (e.g., product identifier) that renders the URL invalid, and returning information regarding one or more related items to the user. Another rescue strategy involves mining the invalid URL for one or more text strings reflective of the type of content desired, and then using the one or more text strings to execute a keyword search to identify content to provide to the user. The various rescue strategies may be attempted in sequence according to a hierarchy.

16 Claims, 5 Drawing Sheets

(56) References Cited

U.S. PATENT DOCUMENTS

| | | |
|---|---|---|
| 7,853,678 B2 | 12/2010 | Khemani et al. |
| 7,853,679 B2 | 12/2010 | Khemani et al. |
| 7,865,589 B2 | 1/2011 | Khemani et al. |
| 7,870,277 B2 | 1/2011 | Korrapati et al. |
| 8,073,829 B2 | 12/2011 | Lopez et al. |
| 2002/0056053 A1 | 5/2002 | Vine et al. |
| 2002/0059396 A1 | 5/2002 | Holzer et al. |
| 2002/0065850 A1 | 5/2002 | Baudu et al. |
| 2002/0083130 A1 | 6/2002 | Shimada et al. |
| 2002/0116531 A1 | 8/2002 | Chu |
| 2002/0156841 A1 | 10/2002 | Landfeldt et al. |
| 2003/0084034 A1 | 5/2003 | Fannin |
| 2003/0188021 A1 | 10/2003 | Challenger et al. |
| 2004/0030780 A1 | 2/2004 | Walters |
| 2004/0107296 A1 | 6/2004 | Donker et al. |
| 2004/0267961 A1 | 12/2004 | Dietz et al. |
| 2006/0112066 A1* | 5/2006 | Hamzy .............................. 707/1 |
| 2006/0218304 A1 | 9/2006 | Mukherjee et al. |
| 2007/0061317 A1 | 3/2007 | Ramer et al. |
| 2008/0229025 A1 | 9/2008 | Plamondon |
| 2010/0095018 A1 | 4/2010 | Khemani et al. |
| 2011/0010612 A1 | 1/2011 | Thorpe et al. |
| 2012/0131095 A1 | 5/2012 | Luna et al. |

OTHER PUBLICATIONS

U.S. Appl. No. 12/822,386, filed Jun. 24, 2010, Brundage, et al.

Plotnikoff, D., "*Navigation tools help the Web traveler,*" 3-page newsletter from San Jose Mercury News, dated Feb. 5, 2000.

3-page Press Release titled "*Alexa Internet Integrates Related Links and Archive of the Web into Internet Explorer 5 Release,*" dated Mar. 18, 1999.

Wexelblat, A., and Maes, P., "*Footprints: History-Rich Tools for Information Foraging,*" Proceedings of ACM CHI'99 Conference, ACM Press, May 15-20, 1999.

Wingfield, N., "*Internet Companies See Value in Misaddressed Web Traffic,*" The Wall Street Journal, Online as of Friday, Sep. 5, 2003, pp. 1-3.

\* cited by examiner

URL RESCUE BY EXECUTION OF SEARCH USING INFORMATION EXTRACTED FROM INVALID URL

BACKGROUND

In computing, a URL (Uniform Resource Locator) is a type of Uniform Resource Identifier (URI) that specifies where an identified resource is available and the mechanism for retrieving it. For example, the "address" of a web page on the World Wide Web, e.g. http://www.example.com, is a URL. However, URL links may not always lead to the correct web page. For example, links may be malformed, out of date, or otherwise incorrect. In some cases, only part of the URL may be incorrect and the user can reach the correct web site but not the correct web page. For example, a URL may specify the correct web site or domain, but may fail to identify a valid page or other resource.

When a web server receives a URL request that identifies an invalid URL, the web server typically returns an error message or error page. For example, the web server may return an HTTP 404 message that causes the browser to display a standard "page not found" message. When users receive such error messages and pages, they frequently stop browsing the web site. Thus, a need exists to provide responsive content to users in response when a request for an invalid URL is received.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION OF SPECIFIC EMBODIMENTS

In certain embodiments, computer systems and methods are provided that allow a web site or server to provide responsive content to a user when a URL requested by the user's computing device is invalid or irresolvable. The process of identifying the responsive content is referred to herein as "rescuing" the URL. Various rescue strategies are disclosed. One such rescue strategy involves repairing the URL by filtering out escape sequences or other non-useful characters, and/or by removing or correcting one or more layers of encoding. Another rescue strategy involves determining that the URL contains an obsolete or outdated item identifier (e.g., product identifier) that renders the URL invalid, and returning information regarding one or more related items to the user. Another rescue strategy involves mining the invalid URL for one or more search terms, and then executing a keyword search to identify content to provide to the user.

These and other URL rescue strategies may be used individually or in combination within a given system to reduce the frequency with which users are presented with error messages or other non-responsive content. For example, the disclosed rescue strategies may be implemented by a web site that hosts an electronic catalog of products or other items that are available for purchase, rental, and/or download. The web site may select a rescue strategy to apply to a given URL request based on the content of the URL, and/or based on the outcome of one or more prior rescue attempts. When the URL is successfully rescued, the page provided to the user may optionally be supplemented with messaging reflective of the type of recovery strategy used. As one example, the user may be presented with a product detail page indicating that the requested URL is invalid, but that the product represented on the page is related to the requested URL.

Throughout this description, the term "web site" is used to refer to a networked computing system or web server system that responds to URL requests from user computing devices by returning content, including web pages. A web site ordinarily includes one or more physical servers (which may but need not be co-located), and may include various other types of computing devices (load balancers, switches, etc.). The functions described herein are preferably embodied in code modules executed by one or more servers or other computing devices of the web site.

Figure 1:
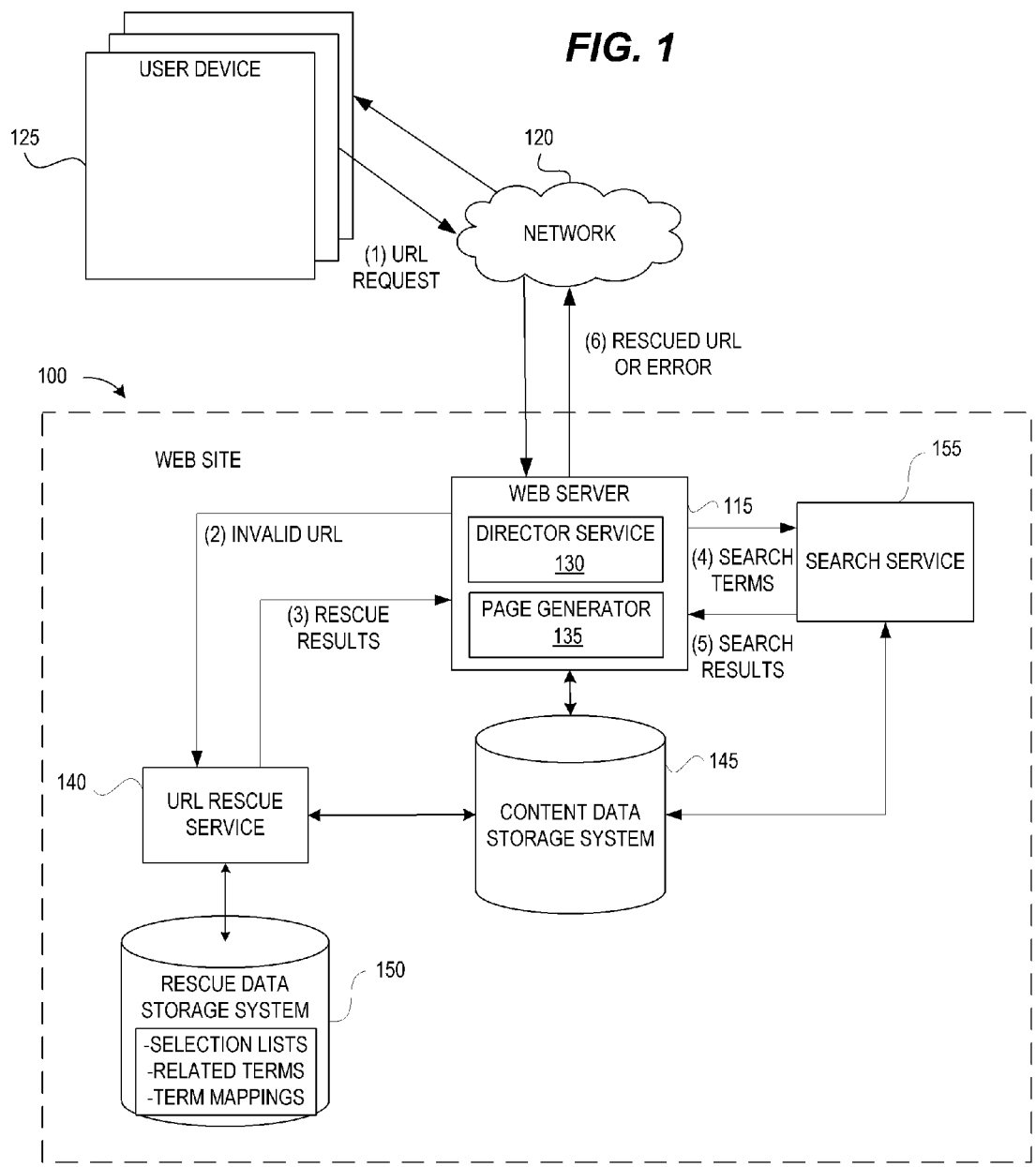
FIG. 1 illustrates a block diagram of an embodiment of a URL rescue system.

FIG. 1 illustrates one embodiment of a web site that implements a URL recovery system 100. In one embodiment, the system 100 can be incorporated in a web site. FIG. 1 shows components of the website that may be involved in the URL rescue process but does not necessarily include all components of such a website. The URL rescue system 100 includes a web server 115 that processes request messages received over a network 120, such as the Internet, from users operating user computing devices 125, each of which can run a web browser or other web client program. The computing devices 125 can communicate to the web server 115 using a network 120, such as a public network, private network, and/or the Internet. The network 120 can use a wired or wireless communication medium. The user computing devices 125 may include, for example, personal computers (PCs), personal digital assistants (PDAs), cellular telephones, laptops, tablets, e-book readers, and other types of devices that support web browsing.

The URL rescue system 100 can include components such as a content data storage system 145 for storing content, such as web pages or content for web pages, on the web site, a URL rescue service 140 for repairing or substituting invalid URLs, and a rescue data storage system 150. In one embodiment in which the web site hosts an electronic catalog of items, the content data storage system stores catalog content associated with the various products or other items represented in the electronic catalog. The rescue data storage can include selection lists, related terms, and/or term mappings. The components can be connected to each other via a network, such as a public network, private network, and/or the Internet. The components can be operating on one or more computing devices.

In one embodiment, the web server 115 includes, or runs in conjunction with, a director service 130 that is responsible for decoding URL requests to evaluate whether each such request resolves to a known location or content item. In one embodiment, the director service 130 operates by analyzing each URL request according to a set of rules, and by passing URLs or URL parameters to specific physical servers or services based on the results of this analysis. In one embodiment, the web server 115 includes a page generator service 135 for dynamically generating pages. Many web sites use dynamically generated pages in order to provide dynamic and/or updated content, such as user reviews, current sales rank, prices, available stock, or other information that may change with time.

A URL request message, such as an HTTP message of the form GET URL, is initially received from a user computing device and/or web client 125. In one embodiment, the URL included in this request message is a string of characters of the form www.domain_name/char_string, where domain_name is a domain name of a web site or domain to which the request is directed (e.g., "example.com"), "/" is a separator character, and char_string is a character string that may or may not be a valid location on the web site. The domain name may be associated with IP addresses of one or more web servers of the web site/domain. The character string may include spaces, slashes, hyphens, and other types of non-alphabetic characters. Although a forward slash is used in this embodiment, a different separator character, such as a backward slash, question mark, space, plus sign, or the like may additionally or alternatively be used.

In one embodiment, when a URL request is received, the web server/director 115, 130 service evaluates the URL, for example the char_string portion of the URL, to determine if it resolves to a valid location or content item. In one embodiment, the web server/director 115, 130 may include rewrite rules for altering the received URL. If the URL correctly resolves, then the web server/director service returns the requested webpage. However, if the URL is invalid or may otherwise generate an error message, the director service 130 can pass the URL to a URL rescue service 140. The URL rescue service then attempts to rescue the URL and provides the results of the rescue attempt to the web server 115.

The URL rescue service 140 receives the URL or a portion of the URL, such as the char_string, and attempts to rescue the URL in order to identify the intended destination of the user or at least provide information related to the intended destination. As described below, several rescue processes may be used to rescue the URL. In an embodiment, the URL rescue service 140 communicates with a rescue data storage system 150 which can contain data such as selection lists, related terms, term mappings, or the like for rescuing URLs.

After processing the URL, the URL rescue service 140 can generate rescue results, such as a revised or rescued URL. The revised URL can be tested, for example, by the URL rescue service 140 or the web server 115 to see if it resolves to a known webpage. If the revised URL is resolvable or rescued, the URL rescue service 140 completes and provides the rescued URL to the web server 115. If the URL still cannot be resolved, the URL rescue service can, in one embodiment, generate search terms based on the requested URL. In one embodiment, the rescued URL and/or search terms are transmitted to the web server 115. The URL rescue service 140 can also store and/or send to web server 115 metadata associated with the rescue attempt, such as the rescue strategy used, the effectiveness of a particular strategy, and/or characteristics of invalid URLs received. The web server can respond to the user with the web page corresponding to the rescued URL, if it receives a rescued URL. If the web server receives search terms, the web server can communicate with a search service 155 in order to execute a search using the search terms. The web server can then provide a search page with search results to the user computing device 125. In one embodiment, the search results from the search service are evaluated, for example, by the web server 115 or the search service 155, for relevance to the search terms. If the search results are empty or the results are not relevant, the web server can return an error message to the user computing device 125.

The various components shown in FIG. 1 can be implemented using software modules executed by one or more general purpose computers (physical machines) or servers. For example, the URL rescue service 140 and/or director service 130 may be implemented as respective programs using service code that generates responses in real time in response to requests from other entities. The interfaces for the web server 115 may be implemented in a combination of executable code and web page templates. The executable code of the various components in FIG. 1 may be stored on any type or types of physical computer storage device or medium, such as hard drives, tape drives, CDs, DVDs, RAM, ROM, flash and/or the like. As will be apparent, components shown on FIG. 1 can be combined together or otherwise operate on the same physical computing system. For example, the web server 115 can include or operate alongside the URL rescue service 140. The data storage systems 145, 150 may be included in the web server 115. The data storage systems 145, 150 may be implemented using any type or types of physical computer storage, and may be implemented using databases, flat files, or any other type of computer storage architecture.

Figure 2:
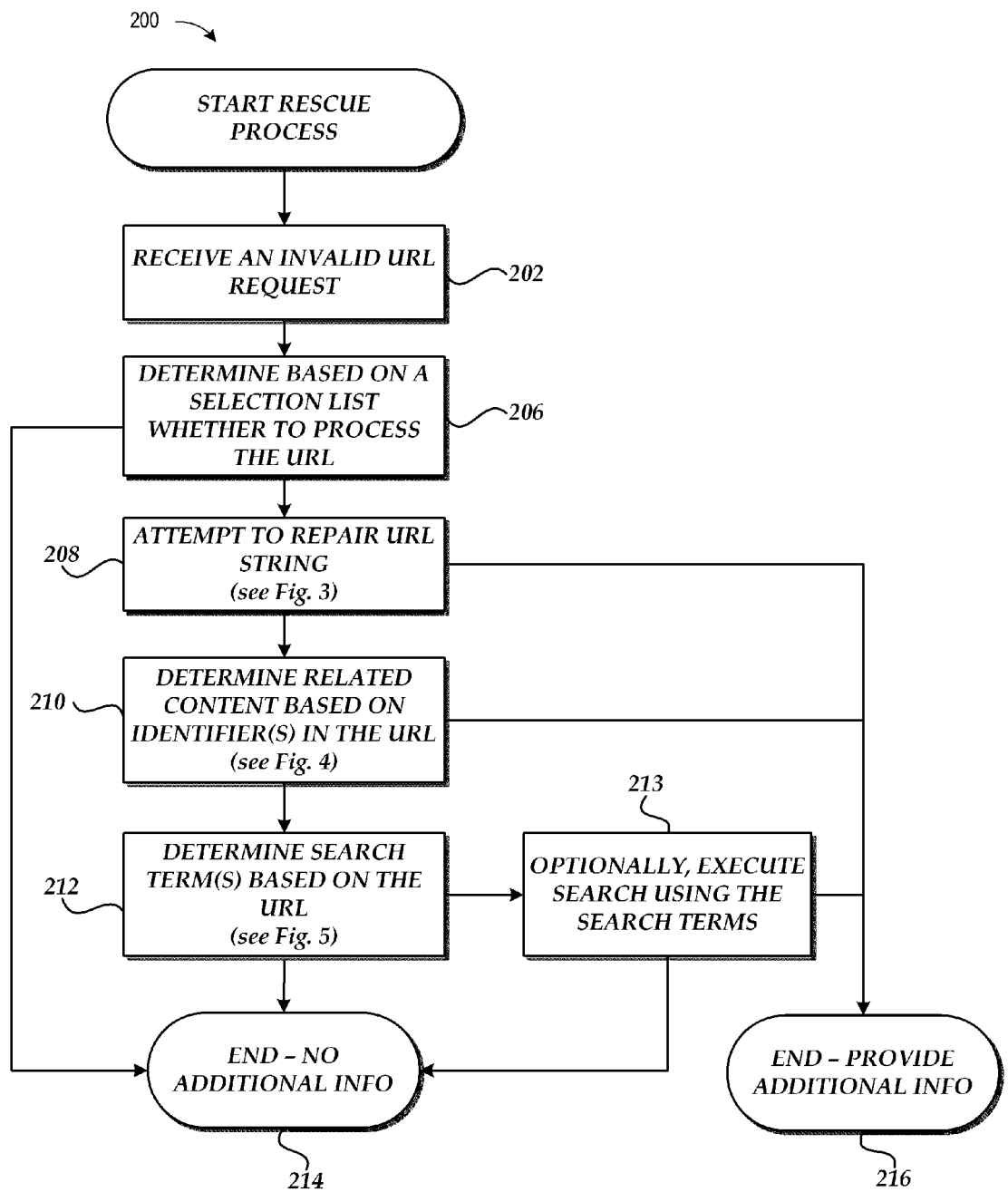
FIG. 2 illustrates an embodiment of a rescue process.

FIG. 2 illustrates an embodiment of a rescue process 200. The rescue process can be used by a computing system or service, such as the URL rescue system 100, URL rescue service 140, web server 115 and/or other website component of FIG. 1. The rescue process 200 attempts to rescue an invalid URL in order to return additional information to the user, for example, by redirecting the user to another page or content.

At block 202, the rescue process 200 receives an invalid URL. In one embodiment, the invalid URL is received by a web server 115 from a user computing device 125. The web server first attempts to resolve the requested URL and, if it cannot do so, it passes the invalid URL to the rescue process 200. Valid URLs received by the web server can be processed normally, with the user provided with the requested webpage. In one embodiment, the URL can include a name of a domain, followed immediately by a single separator character, such as a backslash or forward slash, followed immediately by a character string.

In one embodiment, the web server 115 determines whether the URL request is from a web robot, such as web crawler or spider, and passed invalid URL requests to the rescue process 200 only if the URL request is not from a web robot. If the invalid URL request is from a web robot, the web server can provide an error message, such as 404 error, without an attempt to repair the URL request. Web robots are software applications that run automated tasks over the Internet and typically perform tasks that are both simple and structurally repetitive, at a much higher rate than possible for a human alone. For example, bots are typically used in web spidering, in which an automated script fetches, analyzes and files information from web servers at many times the speed of a human. Each server can have a file called robots.txt, containing rules for the spidering of that server that the bot is supposed to obey. Typically, web robots identify themselves to a server by using the User-agent field of an HTTP request. As web robots can generate large number of URL requests, using the rescue process 200 to repair these requests can result in excess load to the system providing the URL rescue service. Thus, URL requests from web robots may optionally be filtered. As will be apparent, filtering out web robot requests may be done during the rescue process 200 instead of by the web server as a preliminary action to the rescue process 200.

At block 206, the rescue process 200 can optionally determine whether to continue processing the invalid URL by comparing the invalid URL to a selection list. In some cases, an invalid URL may request types of content not found on the website or otherwise request content for which running a rescue process 200 is not desired. In one embodiment, a web site or web server 115 associated with the rescue process 200 continues to respond with an error message to requests for images, favicons (e.g. favorites icons), Flash content, or the like, not found on the web site. In one embodiment, the selection list is a blacklist of patterns to exclude. The rescue process 200 can compare the blacklist with the URL, for example, using pattern matching, to determine whether to further process the URL. In one embodiment, the selection list can include one or more of the following example terms: "favicon", "redirect", "g-images", "ecx.images", ".css", ".jpg", ".jpeg", ".gif", ".js", ".swf", and/or "/aan." As will be apparent, a whitelist including terms for inclusion can also be used.

Similarly to the web robot filtering action described above, the above determination action may be accomplished by rescue process 200, by the web server 115, or some other computing device before an invalid URL is sent to the rescue process 200. Thus, in one embodiment, the web server filters out some invalid URLs using a selection list as described above.

At block 208, the rescue process 200 attempts to repair the URL string. URL repair can include fixing or removing URL encoding, sanitizing the URL by removing or replacing particular characters, and/or otherwise modifying the characters in the URL. In one embodiment, the rescue process 200 checks if the repaired URL resolves to a valid web page. The rescue process 200 can then either continue to block 210 if URL repair fails or the process can end at block 216 if the repair succeeds by providing the additional information found, such as the user's intended destination webpage, based on the URL. Block 208 is described in more detail below with reference to FIG. 3.

At block 210, the rescue process 200 attempts to identify related content based on one or more identifiers in the URL. For example, the URL can contain a product identifier for a previous version (e.g. previous book edition) that is no longer included in the electronic catalog. Where such a product identifier exists in the URL, the rescue service may look up the ID of a related product (e.g., a new edition of the book) using a relationship mapping database, and the web server may return information regarding the related product. In some embodiments, more than one level of relationship can be used to find related content. For example, a first relationship determination can involve looking up a book by an International Standard Book Number (ISBN) found in the URL, and identifying additional book information. In one embodiment, the related product information is stored on the content storage data system 145. The second relationship determination can involve using the additional book information, for example, author, title, description or the like, to identify additional related content. After related content has been identified, a web page with the related content can be provided to the user. The rescue process 200 can then either continue to block 212 if the identification of related content fails or the process can end at block 216 the identification of related content fails succeeds by providing the additional information found based on the URL, such as the URL of a webpage containing related content.

At block 212, the rescue process 200 mines the invalid URL for one or more text strings that are potentially useful for conducting a keyword search. URL's can often contain information about the target web page. For example, keywords in the URL can be used to run a search. If one or more suitable search terms are identified, the rescue service 140 or the web server 115 may proceed to block 213 and pass the search term(s) to a search engine or service 155 to conduct a search, such as a search of the electronic catalog. If no search terms are found, the process 200 can end at block 214.

In one embodiment, the rescue process 200, having identified search term(s) can bypass block 213 and proceed to block 216 without executing a search but instead provide the search term(s) to the web server 115. The web server can then execute a search.

At block 213, the rescue process 200 optionally executes a search using the search terms and provides the search results to the web server 115. The web server 115 may then return a page that includes the results. The rescue process 200 can then either end at block 214 if no search results are generated or if the search results are not relevant to the search terms or the process can end at block 216 if search results are found by providing the additional information found. In one embodiment, an HTML error is provided to the user computing device when no additional information is found. In one embodiment, a new page containing the additional information is provided to the user. Pages or content can be on the domain or outside the domain, such as on a server different from the web server. For example, the page can be on a content delivery network associated with the domain or in a server on a separate domain.

At block 214, the rescue process 200, having found no additional information based on the URL, ends. The rescue process can notify the web server 115 of the rescue results (or the lack of). The web server can then return an error message, such as a 404 error. While 404 errors are most commonly returned message when a page is not found, other similar errors messages may be used, such as a 410: "Gone" or 301: "Moved Permanently."

At block 216, the rescue process 200, having found additional information based on the URL, ends. The rescue process can notify the web server 115 of the rescue results, such as a repaired URL, alternate URL, or search term(s), or search result(s). The web server can then return a webpage or content, for example, an image, a video, an audio file or the like, corresponding to the repaired or related URL or a search page based on the search terms. In one embodiment, the rescued URL can be tagged with a marker or data is otherwise recorded in order to indicate which rescue strategy was used to redirect to that URL, allowing tracking of the effectiveness of particular rescue strategies, guarding against infinite rescue attempts and/or facilitating improvements to the rescue process 200. If the web server 115 serves a page different from the original requested URL (e.g. related URL or search page), the web server 115 can include a message in the page notifying the user that the requested page was not found and/or that a related page or pages has been found.

Figure 3:
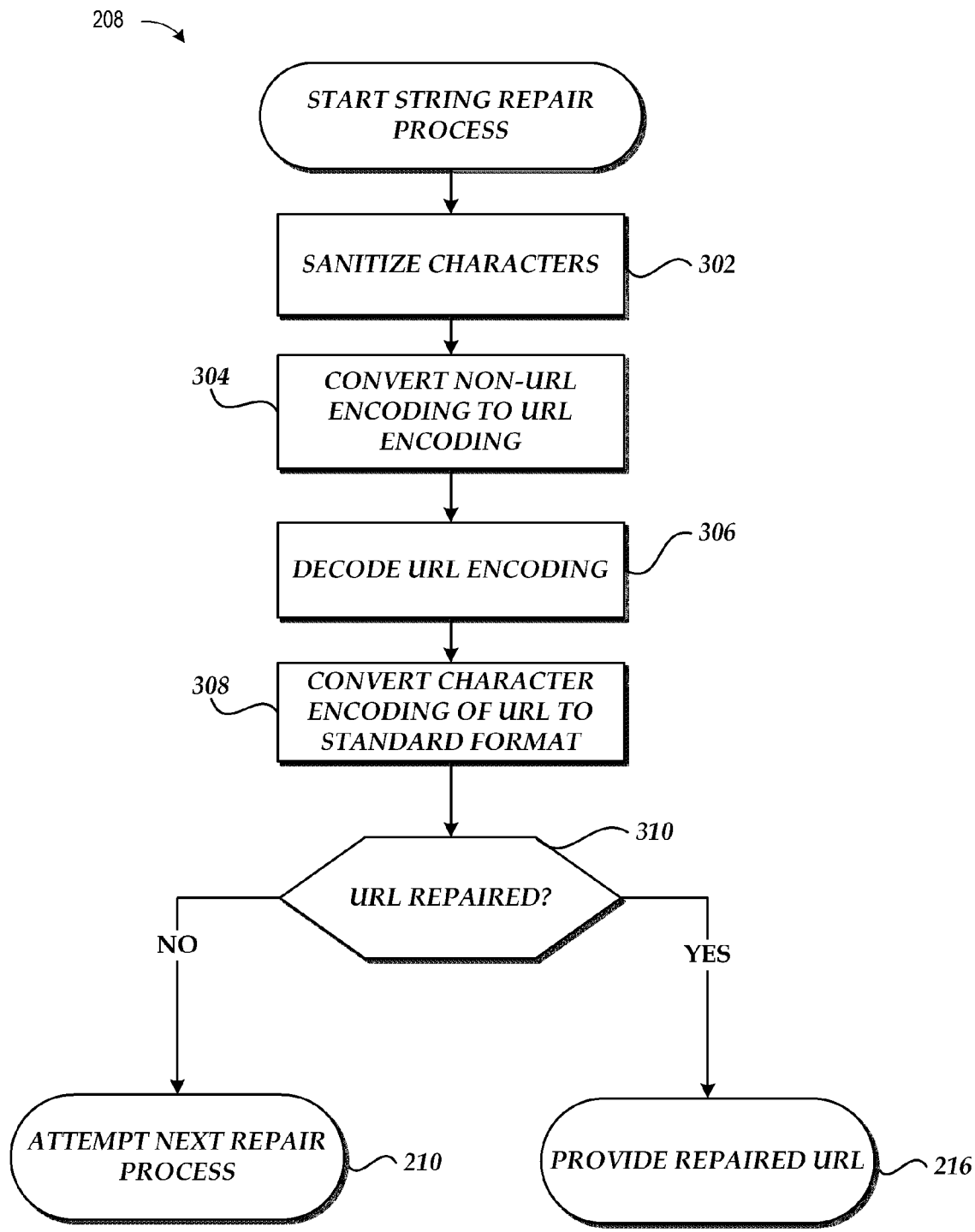
FIG. 3 illustrates an embodiment of a string repair process of FIG. 2.

FIG. 3 illustrates an embodiment of the string repair process 208 of FIG. 2. The string repair process 208 can include repairing or removing URL encoding, sanitizing the URL by removing or replacing particular characters, or otherwise modifying the characters in the URL.

At block 302, the string repair process 208 sanitizes the URL string, for example, by removing and/or replacing non-useful characters, if any, such as "<" and/or ">". Such characters may be added to the string as a result of translations from one encoding to another by user programs or by programs operated by other websites. For example, the URL may be stored in an XML document using XML encoding. Characters can also be simplified by mapping several possible representations of the character to a single characterization, to simplify processing. For example, "+", which can be used to represent a space character, can be replaced with the space character ( ). In some embodiments, sanitization provides additional security be removing malicious content embedded in the URL, such as HTML injection or cross site code for bypassing client-side security mechanisms.

At block 304, the string repair process 208 converts non-URL encoding, if any, to URL encoding. In some instances, the requested URL may have been converted to another format, such as XML, for example if the requested URL was found in an XML document. XML entitization escapes certain character sequences so that they are valid in an XML context. For example, some special characters in XML such as "<" and ">" are reserved or have special meaning and need to be entitized in order to be rendered or displayed on screen as a regular character.

Generally, an entitized character is represented by an escape sequence or predefined entity composed of an escape character followed immediately by subsequent characters. These escape sequences are known and defined as part of the specifications for the language or protocol, such as XML or HTML, and are used to denote a corresponding special character. Typically, an escape character is a character which invokes an alternative interpretation on subsequent characters in a character sequence and is part of the syntax for many programming languages, data formats, and communication protocols. For example, in XML, the ampersand (&) is replaced with the XML entity "&". However, web servers do not normally know how to interpret XML-entitized URLs, resulting in an error when trying to resolve the URL.

By reversing the encoding (e.g., by converting "&" back into "&"), the string repair process 208 can, in some situations, convert a broken or irresolvable URL into a functional one. The following is a sample irresolvable or invalid URL converted to a fixed or resolvable URL.

An example Invalid URL:
http://www.catalog.com/s/ref=nb_sb_noss?url=search-alias%3Daps&field-keywords=Harry+Potter&x=0&y=0

An example Fixed URL:
http://www.catalog.com/s/ref=nb_sb_noss?url=search-alias%3Daps&field-keywords=Harry+Potter&x=0&y=0

In general terms, URL repair, in one embodiment, involves identifying escape sequences in the character string through a comparison with known escape sequences. The escape sequence begins with an escape character followed immediately by one or more sequence characters. The entire escape sequence corresponds to an escaped or special character. During URL repair, one or more non-URL escape sequences in the character string can be replaced by a corresponding escaped character. As described above, the escape sequences can be XML entities, though other escape sequences can be modified. For example, XML entities and HTML entities begin with an ampersand (&) as an escape character while URL uses a percent sign (%) as an escape character.

Some possible escape sequence and escaped character pairings for repairing XML entitization can include: replace "&" with "&"; replace "'" with "'"; replace """ with """; replace "<" with "<"; replace ">" with ">"; replace "&#NNNN;" with the Unicode character corresponding to the decimal number NNNN; replace "&#xNNNN;" with the Unicode character corresponding to the hexadecimal number NNNN; and/or replace all HTML entities, for example, replace " " with the space character ( ). As will be apparent, different character substitutions can be made if a format other than XML is used.

At block 306, the string repair process 208 can decode URL encoding. In some instances, URLs can be doubly encoded or URL-escaped twice. For example, instead of containing %20 for the space character, the URL may contain %2520, which results from first escaping the space character as %20, and then escaping the percent character (%) as %25. In an embodiment, the string repair process 208 re-decodes the URL a second time, for example, by substituting escape sequences beginning with "%" with the corresponding escaped character. The first URL decoding can be accomplished by the string repair process 208, a web server, or some other entity before the string repair process receives the URL.

At block 308, the string repair process 208 can convert the character encoding of the URL to an expected format. Typically, URLs can be expected to be encoded in UTF-8 character format. However, some URLs, for example URL's in countries other than the United States, can use non-standard encoding, such as GBK. By converting the character encoding, a resolvable URL may be generated.

At block 310, the string repair process 208 can determine whether the URL repair succeeded. In one embodiment, if any changes were made in blocks 302-308, the rescue service 140 or web server tests the modified URL. If the modified URL resolves, the repair process 208 proceeds to block 216 and provides the modified URL to the web server 115, ending the repair process 208. The URL request is serviced by the web server 115 using the modified (repaired) URL. If no changes were made, or the modified URL is still irresolvable by the web server, the repair process 208 proceeds to block 210 and the next rescue strategy of FIG. 2 (e.g. block 210) is attempted.

Figure 4:
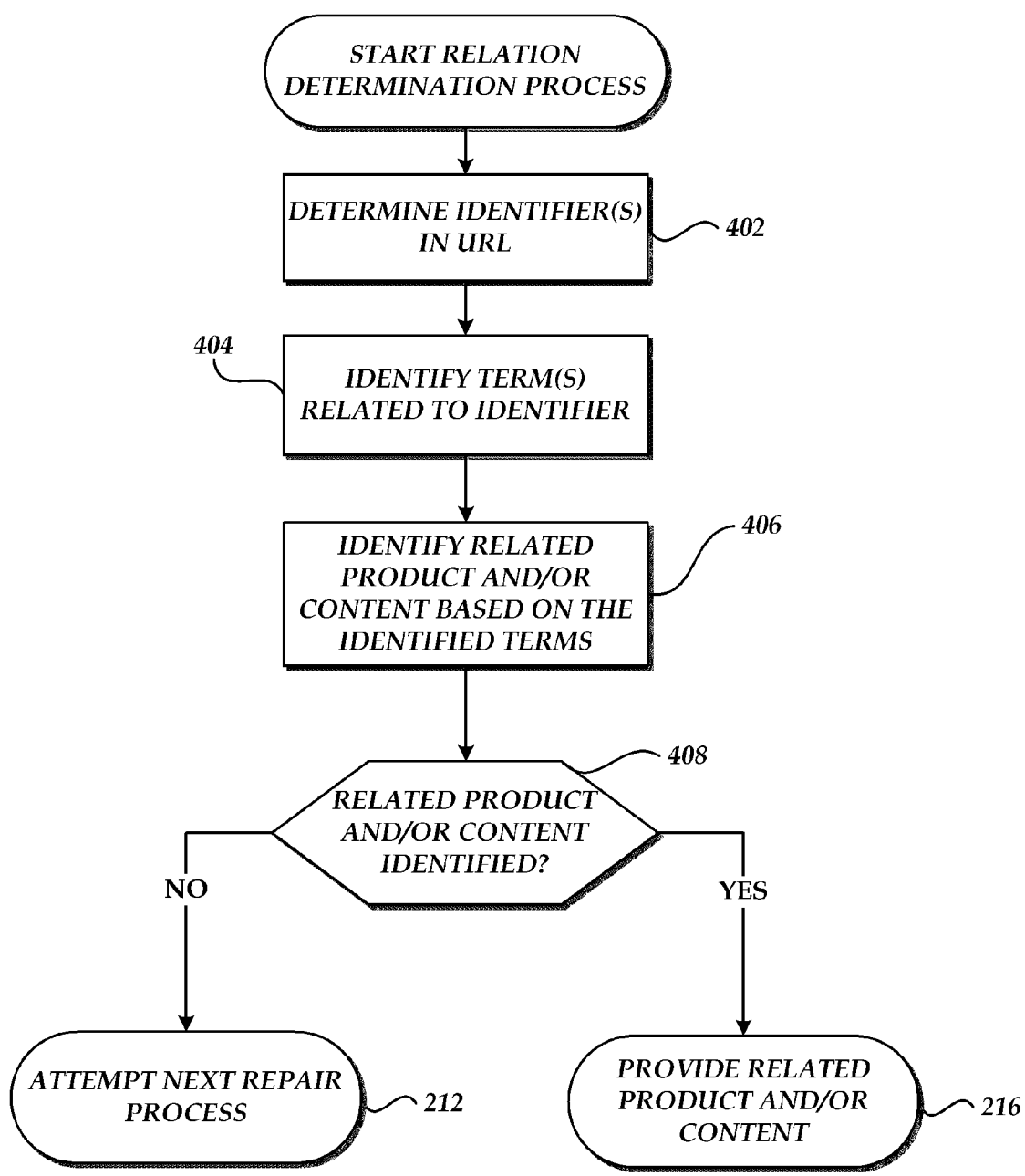
FIG. 4 illustrates an embodiment of a relation determination process of FIG. 2.

FIG. 4 illustrates an embodiment of the relation determination process 210 of FIG. 2. The relation determination process 210 can determine related content based on one or more identifiers in an irresolvable URL. Many web sites, particularly retail sites, use identifiers to refer to products available on the web site. URLs for pages on these web sites can include such identifiers. For example, the URL for a product detail page of the catalog will typically include a unique identifier of the product. However, products can sometimes be discontinued or otherwise may no longer be available, such that the web page for a particular product may no longer exist. Still, the web site may retain information about the product, allowing the web site to identify a related product that is currently being offered or advertised. For example the web site may include a database or relationship mapping that maps past product IDs to IDs of related products, such as replacement or superseding products. Other types of relationships that can be mapped include authorship, editions, membership in compilations or product sets, and/or product recommendations based on a selected product. Such item-to-item mappings may be created manually, or may be generated automatically based on user behaviors and/or content-based item similarities.

At block 402, the relation determination process 210 determines or retrieves one or more identifiers in the URL. In some embodiments, an identifier can uniquely correspond to or uniquely identify a product or other item. For example, the identifier can be an ISBN, a product code, SKU, or similar identifier for a product or other item offered or sold on the web site or included in the web site's catalog. The products or items can include, for example, movies, books, musical works, electronics products, articles clothing, computer programs, new stories, mobile service plans, and subscriptions. In one embodiment, identifier(s) are designated using parameters and can be identified using those parameters.

At block 404, the relation determination process 210 identifies one or more terms related to the identifier. The identified term can be another identifier, descriptive information associated with the identifier, and/or characteristics of the product associated with the identifier.

In one embodiment, the determination process 210 can access descriptive information or characteristics associated with an identifier. For example, if the identifier is associated with a book, the descriptive information can include a product description, a summary, an author name, a title, or other additional information. The determination process 210 can select terms from the descriptive information to identify related products.

At block 406, the determination process 210 can use the identified term(s) to identify products and/or content related to the requested identifier or product. For example, if the identified term is an item identifier, the determination process 210 can find a webpage for a product or item related to the requested identifier. For instance, if the user requested the product detail page for product X, and no such page exists, the web server may return the product detail page for product Y, which is a substitute or replacement for product X. The returned page may be supplemented with a message indicating the relationship between product X and Y. In another example, if the related content is a characteristic of the requested product, the determination process 210 can search for other products or other items with the same or similar characteristics. By using relationships between products, a web page with information about the related item(s) may then be returned.

An example product mapping:

| Product ID | Product | Related Product ID | Related Product |
|---|---|---|---|
| prod001 | World Almanac 2009 | prod002 | World Almanac 2010 |
| prod003 | Camera model 100 | prod004 | Camera model 101 |

An example Invalid URL:
http://www.catalog.com/product/product_id=prod001
An example Related URL:
http://www.catalog.com/product/product_id=prod002

The identifiers can reference many different types of products or content. For example, a product can be a manufactured good having characteristics such as a product name, a model number, and a manufacturer. In another example, the product can be a creative work, such as a musical work, an article, or a novel having characteristics such as a title, an author, membership in a collected work, or the like.

At block 408, the relation determination process 210 determines if a related product or content has been found. In one embodiment, if no related product or content was found, the relation determination process 210 proceeds to block 212 and the next rescue strategy of FIG. 2 (e.g. block 212) is attempted.

If a related product or related content is found, the determination process 210 proceeds to block 216 and provides a URL to a webpage associated with the related product or content to the web server 115. In one embodiment, the relation determination process 210 provides search term(s) based on the identifier(s) to the web server 115 or the web page associated with the provided URL can be a search page based on identified term(s) determined from the identifier. The web page's URL can comprise an identifier of the related content or product. For example, some web sites incorporate product identifiers of the product described in a webpage within the webpage's URL.

Figure 5:
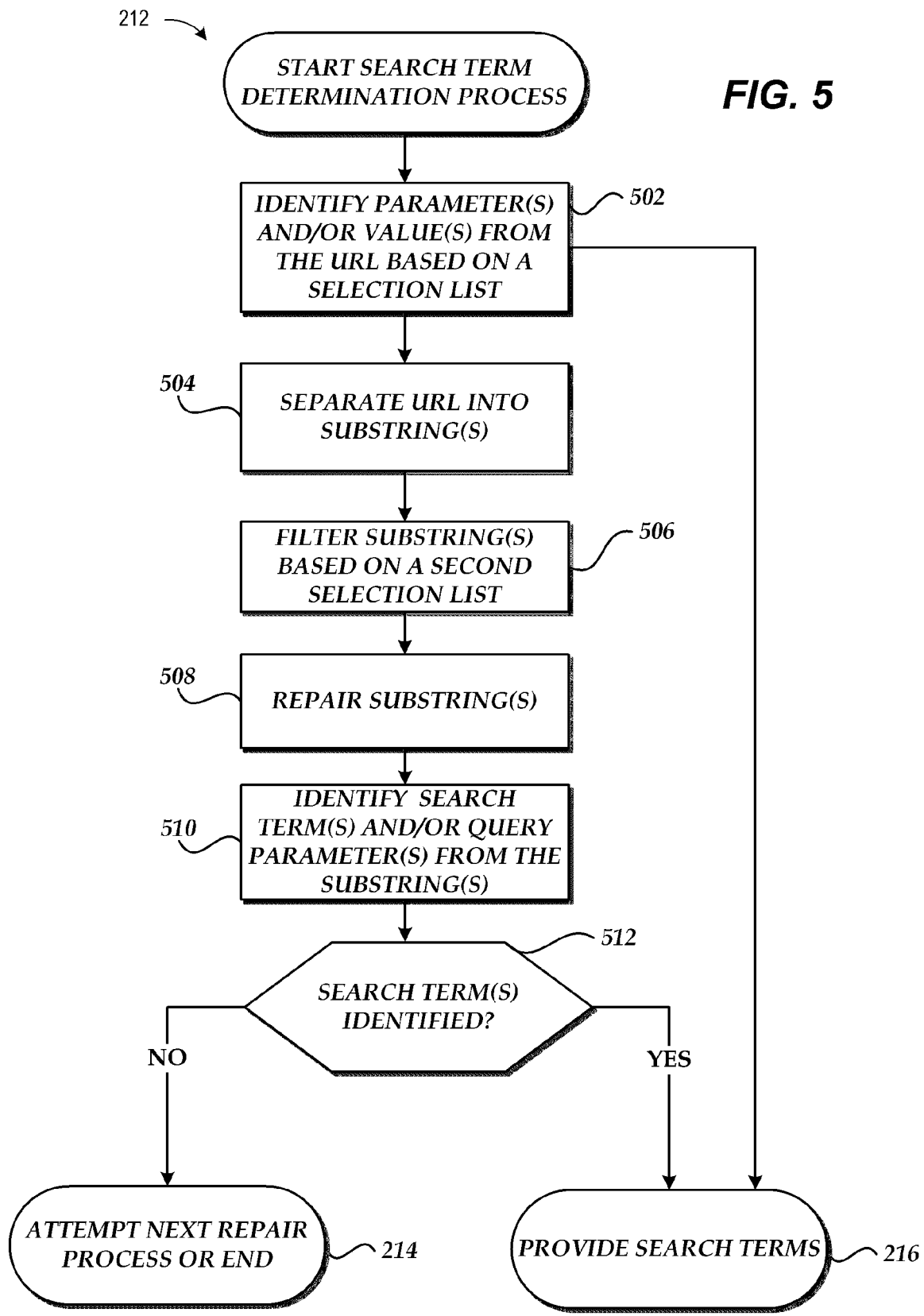
FIG. 5 illustrates one embodiment of a search term determination process of FIG. 2.

FIG. 5 illustrates one embodiment of a search term determination process 212 of FIG. 2. The search term determination process 212 can identify one or more search terms from the URL. URLs can sometimes include names and other text strings that are useful for conducting a keyword search.

At block 502, the search term determination process 212 can identify parameter(s) from the URL based on a selection list. The selection list can include a whitelist, blacklist, pattern matching rules or other filtering mechanism. In one embodiment, the selection list identifies one or more positions in the URL corresponding to parameter(s). For example, a URL can contain parameters after a particular keyword or character string, which can be identified by the selection list. In another example, the selection list can indicate that parameters are located in a certain position in the URL, where a position is delineated by separator character(s). A parameter can be a string of characters used to identify a value or following character string. Typically, a delimiter, such as "=", separates the parameter and the value (e.g. "parameter=value"). The URL can be compared to a selection list of known parameters in order to identify parameters for executing a search. For example, the selection list can include one or more parameters such as "s", "n", "brand", "field-keywords", "keywords", "node", "search-alias", "index" or other parameters. In one embodiment, parameters can be renamed, for example, "n" could be expanded to "node."

The value associated with a parameter can be used as a search term. In one embodiment, a parameter can also be used as a search term or as a query parameter for modifying the search. Query parameters can allow a search to be more targeted by limiting the search to particular criteria. For example, query parameters can limit the search to particular product categories, manufacturers, dates, or other search term type.

In some embodiments, the search term determination process 212 can proceed to block 216 and end, for example, if one or more keywords have been identified. In some embodiments, the process 212 proceeds to block 504 if no search terms have been identified or in order to generate additional search terms.

At block 504, URLs can be separated into separated strings or substrings based on delimiters in the URL. For example, strings can be divided based on "/", "\" or a space character. The separated strings can be used as search terms.

At block 506, the separated strings can be filtered based on a second selection list. Many strings in a URL may not be descriptive of the contents of a webpage but instead be a common URL term. For example, the string "html" denotes the file type of the web page but does not identify the content included in the webpage. In one embodiment, the selection list is a blacklist used to identify common URL strings. For example, the blacklist can include "product", "tagging", "rss", "browse", "gp", "errors", "html", "404", "offer-listing", or other strings. By filtering these parameters, more pertinent searches or less resource intensive searches can be run.

At block 508, the search term determination process 212 can repair the strings if needed. The repair process can proceed similarly to the string repair process of FIG. 3. For example, characters in the strings may be sanitized, some characters may be removed or replaced, escape characters removed, and/or some strings URL decoded. In some embodiments, strings can be spell-checked to fix any misspellings.

At block 510, the search term determination process 212 identifies one or more search terms and/or one or more query parameters from the URL strings. In one embodiment, the separated string or strings are used as search terms. In one embodiment, sets of the strings may be grouped to form multiple search terms. For example, parameters and their values can be grouped together while other strings are grouped into a second search term group. In one embodiment, search terms can be grouped based on selection criteria, such as, for example, proper names or brand names.

At block 512, the search term determination process 212 determines whether one or more search terms have been identified. In one embodiment, if no related search term(s) were found, the search term determination process 212 proceeds to block 214 and the next rescue strategy, if any, is attempted or the rescue process 200 ends if no other strategies are available (see block 214 of FIG. 2).

If one or more search terms are found, the determination process 208 proceeds to block 216 and provides the search terms to the web server 115, ending the search determination process. The web server 115 can then execute a search using a search service 155 or query server. The results of the search can be provided to the user. In one embodiment, the search terms are used to identify a single webpage, for example, the webpage with the highest correlation to the search terms, and the single webpage provided to the user. For example, the product detail page corresponding to the most closely matching product may be returned.

The query server can apply the search terms to an index of web pages and/or other content to execute the search request. In one embodiment, this task is performed by treating each term of the search terms, except for noise words such as "and," "a," and "the," as a keyword. In another embodiment, the search string may include one or more groups of words (which may be demarcated using quotations), and may include Boolean operators (e.g., AND, OR and NOT) and/or other operators (e.g., +, −, parenthesis, and NEAR); if no quotations or operators are present, each term, excluding any noise words, may be treated as a keyword. Where the web site hosts an electronic catalog of products or other items, the search may be executed as a catalog search that is limited in scope to products or other items represented in the catalog. The results of the search can be returned to the web server, which incorporates some or all of the matching items into a search results page. The web server can then provide the search results to a user or user computing device in response to the irresolvable URL request sent by the user.

Optionally, other processes may be used on the URL in order to generate additional search results. For example, spell correction, category correction, and searching using subsets of the search terms can be used to generate additional search results.

In one sample operation, consider a URL that contains "tagging/rss/Michael+Jackson" in its path. The above algorithm can convert this into a search for "tagging rss Michael Jackson". The first two words are common URL strings and not relevant to a search. In one embodiment, these first two words are blacklisted and thrown out. In another embodiment, the four search terms are used but results in a query with no results. However, subsets of the search terms can be used in multiple searches, including a subset with just the words "Michael Jackson". The results from the query subset producing the best results can then be provided to the user.

While FIGS. 3-5 have been described in reference to the rescue process 200 of FIG. 2, it will be apparent that the processes described in FIGS. 3-5 can be implemented independently of each other and the rescue process 200 of FIG. 2. In one embodiment, the processes of FIGS. 3-5 are independent rescue processes. In addition, while the above processes have been disclosed in reference to processing URLs, it will be apparent that the described processes could also be applied to other forms of web page addressing, such as other types of URIs.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented URL rescue process, said URL rescue process comprising:
    receiving, by a hosting site, a URL (Uniform Resource Locator) request from a user device, said URL request specifying a URL, the URL request including an address of the hosting site and a character string referencing a content location on the hosting web site;
    detecting that the URL is invalid by detecting that the content location is not found on the hosting site;
    in response to detecting that the URL is invalid, attempting, as a first URL rescue strategy, to repair the invalid URL through URL modification;
    determining that the attempt to repair the invalid URL through URL modification has failed to produce a modified URL that resolves to a valid content location on the hosting site; and
    executing an alternate URL rescue strategy that does not attempt to repair the invalid URL, said alternate URL rescue strategy comprising:
        extracting from the invalid URL a set of one or more search terms for executing one or more searches, wherein extracting the set of one or more search terms comprises using delimiters in the invalid URL to identify a substring of the invalid URL, and comparing the substring to entries in a selection list to determine whether to use the substring as a search term, said extracting resulting in a selection of less than all text of said character string for use in executing the one or more searches;
        executing one or more searches of content of the hosting site using the one or more extracted search terms, wherein executing the one or more searches comprises applying the one or more search terms to an index of the content of the hosting site;
        incorporating results of the one or more searches into a page; and
        returning the page to the user device in response to the URL request;
    said URL rescue process implemented by a server system that comprises one or more computing devices.

2. The URL rescue process of claim 1, wherein the alternate URL rescue strategy is executed after said failure of the attempt to repair the invalid URL through URL modification.

3. The URL rescue process of claim 1, wherein the alternate URL rescue strategy is executed at least partly in response to the failure of the attempt to repair the invalid URL through URL modification.

4. The URL rescue process of claim 1, wherein the selection list includes a whitelist.

5. The URL rescue process of claim 1, wherein the selection list includes a blacklist.

6. The URL rescue process of claim 1, wherein the selection list comprises a list of parameters.

7. The URL rescue process of claim 1, wherein the URL rescue process further comprises attempting a third URL rescue strategy that comprises:
    extracting from the invalid URL an item identifier that identifies a first catalog item;
    looking up in a mapping table a second catalog item that is related to the first catalog item; and
    returning to the user device, in response to the URL request, a description of the second catalog item.

8. Non-transitory computer storage having stored thereon executable program code that directs a server system of a hosting site to implement a URL (Uniform Resource Locator) rescue process for responding to a resource request received by the server system from a user device, said URL rescue process comprising:
    receiving, by the server system, the resource request from the user device, the resource request specifying a URL that comprises (1) an address of the hosting site, and (2) a character string referencing a content location;
    determining that the URL specified in the resource request is invalid by determining that the character string does not reference a valid content location of the hosting site;
    in response to determining that the URL is invalid, attempting, as a first URL rescue strategy, to repair the invalid URL through URL modification;
    determining that the attempt to repair the invalid URL through URL modification is unsuccessful; and
    attempting an alternate URL rescue strategy that does not repair the invalid URL, said alternate URL rescue strategy comprising:
        extracting from the invalid URL a set of one or more search terms for executing one or more searches of content of the hosting site, wherein extracting the set of one or more search terms comprises using delimiters in the invalid URL to identify a substring of the invalid URL, and comparing the substring to entries in a selection list to determine whether to use the substring as a search term, said extracting resulting in a selection of less than all text of said character string for use in executing the one or more searches;
        executing one or more searches of content of the hosting site using the one or more extracted search terms, wherein executing the one or more searches comprises applying the one or more search terms to an index of the content of the hosting site;
        incorporating results of the one or more searches into a page; and
        returning the page to the user device in response to the resource request.

9. The non-transitory computer storage of claim 8, wherein the alternate URL rescue strategy is attempted at least partly in response to determining that the attempt to repair the invalid URL is unsuccessful.

10. The non-transitory computer storage of claim 8, wherein the selection list includes a whitelist.

11. The non-transitory computer storage of claim 8, wherein the selection list includes a blacklist.

12. The non-transitory computer storage of claim 8, wherein the selection list comprises a list of parameters.

13. The non-transitory computer storage of claim 8, wherein the URL rescue process further comprises attempting a third URL rescue strategy that comprises:
   extracting from the invalid URL an item identifier that identifies a first catalog item;
   looking up in a mapping table a second catalog item that is related to the first catalog item; and
   returning to the user device, in response to the resource request, a description of the second catalog item.

14. A server system comprising one or more computing devices, said server system programmed to respond to a URL (Uniform Resource Locator) request from a user device by a process that comprises:
   identifying a URL specified by the URL request, said URL including an address of a hosting site and including a character string referencing a content location;
   determining that the URL specified in the URL request is invalid by determining that the character string does not reference a valid content location of the hosting site;
   in response to determining that the URL is invalid, executing a URL rescue process that comprises a plurality of URL rescue strategies, including:
      a first URL rescue strategy that attempts to correct the invalid URL through URL modification, wherein the first URL rescue strategy attempts to modify the invalid URL to produce a valid URL that references a valid content location of the hosting site; and
      a second URL rescue strategy that comprises (i) extracting from the invalid URL a set of one or more search terms for executing one or more searches of content of the hosting site, wherein extracting the set of one or more search terms comprises using delimiters in the invalid URL to identify a substring of the invalid URL, and comparing the substring to entries in a selection list, said extracting resulting in a selection of less than all text of said character string for use in executing the one or more searches, (ii) executing the one or more searches of content of the hosting site using the one or more extracted search terms, wherein executing the one or more searches comprises applying the one or more search terms to an index of the content of the hosting site, and (iii) incorporating results of the one or more searches into a page to provide to the user device in response to the URL request.

15. The server system of claim 14, wherein the server system is programmed to attempt the second URL rescue strategy only if the first URL rescue strategy is unsuccessful.

16. The server system of claim 14, wherein the plurality of URL rescue strategies further includes a third URL rescue strategy that comprises:
   extracting from the invalid URL an item identifier that identifies a first item;
   looking up in a mapping table a second item that is related to the first item; and
   returning to the user device, in response to the URL request, a description of the second item.

* * * * *

UNITED STATES PATENT AND TRADEMARK OFFICE
CERTIFICATE OF CORRECTION

PATENT NO. : 8,898,137 B1
APPLICATION NO. : 12/822531
DATED : November 25, 2014
INVENTOR(S) : Michael L. Brundage et al.

It is certified that error appears in the above-identified patent and that said Letters Patent is hereby corrected as shown below:

In the Specification

In column 7 at line 27, change ""&"." to --"&".--.

In column 7 at line 30, change ""&"" to --&--.

In column 7 at lines 36-37, replace "http://www.catalog.com/s/ref=nb_sb_noss?url=search-alias %3Daps&field-keywords=Harry+Potter&x=0&y=0" with --http://www.catalog.com/s/ref=nb_sb_noss?url=search-alias%3Daps&field-keywords=Harry+Potter&x=0&y=0--.

In column 7 at line 56, change ""&"" to --&--.

In column 7 at line 56, change """" to --"--.

In column 7 at line 56, change """" to --'--.

In column 7 at line 57, change "<" to --<--.

In column 7 at line 57, change ">" to -->--.

In column 7 at line 62, change " " to -- --.

Signed and Sealed this
Sixth Day of October, 2015

Michelle K. Lee
*Director of the United States Patent and Trademark Office*